(12) United States Patent
Kolu

(10) Patent No.: US 6,217,833 B1
(45) Date of Patent: Apr. 17, 2001

(54) HIGH EFFICIENCY CORONA DISCHARGE DEVICE FOR GENERATING OZONE

(75) Inventor: Randy Kolu, Hillsburgh (CA)

(73) Assignee: 1357784 Ontario Inc., North York (CA)

( * ) Notice: Subject to any disclaimer, the term of this patent is extended or adjusted under 35 U.S.C. 154(b) by 0 days.

(21) Appl. No.: 09/334,689

(22) Filed: Jun. 17, 1999

(51) Int. Cl.[7] .............................. B01J 19/08; B01J 19/12
(52) U.S. Cl. ................................ 422/186.07; 422/186.15
(58) Field of Search ........................ 422/186.04, 186.07, 422/186.15

(56) References Cited

U.S. PATENT DOCUMENTS

| | | |
|---|---|---|
| 4,124,467 | 11/1978 | Pincon . |
| 4,189,363 | 2/1980 | Beitzel . |
| 5,641,461 | 6/1997 | Ferone ............................ 422/186.07 |
| 5,847,494 | * 12/1998 | Bayliss et al. .................. 313/231.31 |
| 5,871,701 | 2/1999 | Long . |
| 5,914,015 | * 6/1999 | Barlow et al. ....................... 204/177 |

FOREIGN PATENT DOCUMENTS

| | | |
|---|---|---|
| 01153504 | 6/1989 | (JP) . |
| WO 9111395 | 8/1991 | (WO) . |

* cited by examiner

Primary Examiner—Kathryn Gorgos
Assistant Examiner—Wesley A. Nicolas
(74) Attorney, Agent, or Firm—Bereskin & Parr

(57) ABSTRACT

A corona discharge device is provided in which a corona discharge region is formed between the very narrow and small surface area line edges of two electrodes. The electrodes may be generally sheet form and each have a base portion and N protruding portions extending from the base portion (N being an integer and $\leq 1$). The protruding portions of the electrodes are shaped and positioned to intermate with another to define a serpentine shaped region between the electrodes, wherein edges of protruding portions of one electrode and edges of protruding portions of the other electrode are disposed in parallel to and directly opposite one another so as to form $2N-1$ corona discharge region segments therebetween. When the electrodes are energized by a high voltage AC signal a corona discharge is formed in each discharge region segment. Preferably a dielectric wafer lies about half way within each corona discharge region, and is oriented perpendicularly to the plane of the electrodes. When mounted within a chamber, an oxygen containing gas can be fed through the corona discharge regions of the device to conveniently and efficiently generate ozone. The HVAC power circuit which provides the driving AC voltage to the electrodes may also have a corona adjustment level circuit that adjusts the mark-space ratio of the AC voltage.

42 Claims, 5 Drawing Sheets

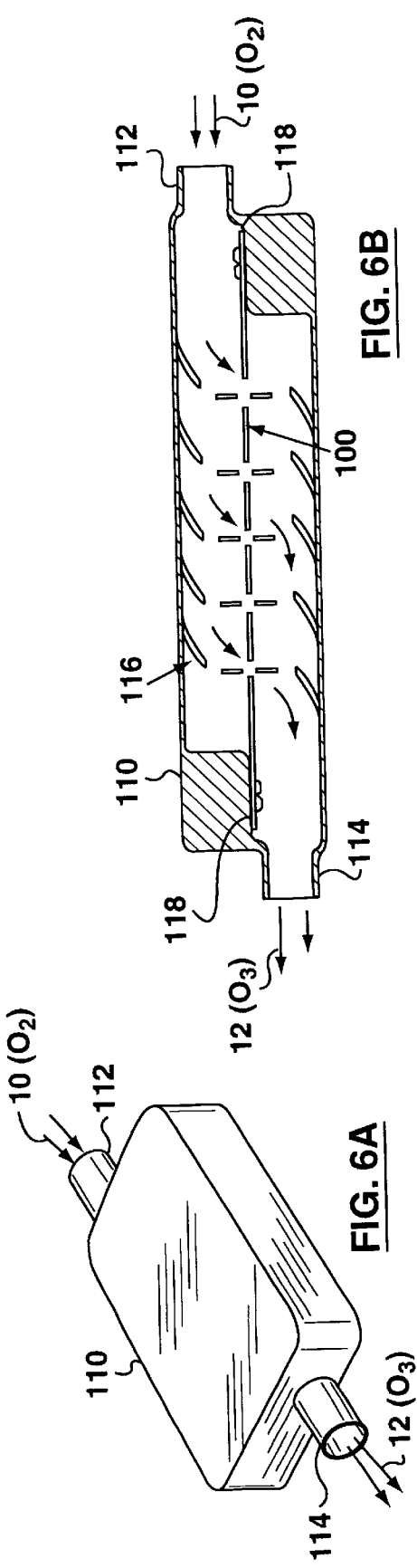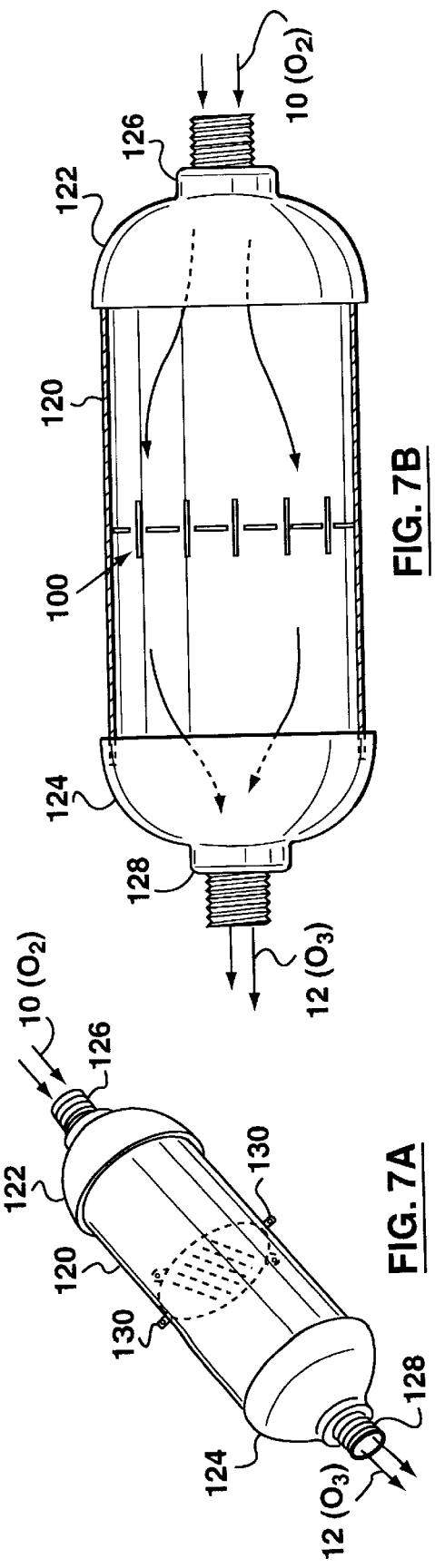

HIGH EFFICIENCY CORONA DISCHARGE DEVICE FOR GENERATING OZONE

FIELD OF THE INVENTION

The present invention relates to a high efficiency corona discharge device particularly suitable for the generation of ozone from an oxygen containing feed gas such as air.

BACKGROUND OF THE INVENTION

Ozone, $O_3$, is a powerful oxidant and has many uses as a purifying agent, germicide, bactericide, and decontaminant of liquids, gases, and solids. Common uses of ozone include drinking water purification, waste water purification, pool and spa water purification, air freshening, bleaching, treatment of industrial waste, and decontamination of food.

Alternative oxidizing agents, which include dioxides, chlorine, bromine, and halogen compounds, are generally less effective than ozone. For example, ozone purifies water and air very quickly and efficiently, and thousands of times faster than chlorine. Other oxidants may also pose dangers during periods of acute exposure. For instance, they may produce a variety of illnesses or syndromes and some of their chemical by-products such as trihalomethanes or THMs and Trichlorethylene (TCE) are highly suspected to be carcinogenic substances. In addition, most of these alternative oxidizing agents require potentially hazardous steps of manufacture, transportation, and storage. Chlorine oxidation also results in the undesirable by-product hydrochloric acid, as well as additional salts in water applications. On the other hand, ozone, in the quantities needed for water purification for example, has no noticeable odour, taste or colour and is not irritating to humans or equipment. Furthermore, the only by-products generally left by ozone upon breakdown are pure oxygen and, in some cases, carbon dioxide or other harmless substances.

Ozone is generated on-site at controlled levels, and so it does not require storage or transportation since it is produced on site wherever required. Indeed, because of the short life of the $O_3$ molecule—it has a half-life of only about 20 minutes in air (and about 2 hours in water) which makes it a powerful oxidizer—ozone cannot be stored for practical purposes. This is also an advantage, as ozone rapidly decays away to safe levels.

Ozone oxidation provides additional benefits as well. Ozone controls microbiological growth, reduces corrosion levels compared to other chemical oxidants (extending equipment life and saving in equipment replacement costs), results in no chemical residual or build up, and allows reuse of water for many applications when combined with a filtration process.

Ozone is generally formed by the action of oxygen atoms ($O_1$) on oxygen molecules ($O_2$). The splitting of the oxygen molecule can be achieved by applying electrical, optical, chemical, or thermal energy to the oxygen molecules. While all of these methods have been used to create ozone in the prior art, optical, chemical, and thermal energy methods are generally very elaborate and costly, and so are usually not suitable for most applications. Most optical methods such as those disclosed by Pincon in U.S. Pat. No. 4,124,467 and by Beitzel in U.S. Pat. No. 4,189,363, use ultraviolet radiation. Generally, in these systems, a special lamp inside an ozone chamber radiates ultraviolet light of a specific wavelength which converts Oxygen molecules ($O_2$) into active oxygen ($O_1$) and ozone ($O_3$) molecules. However, ultraviolet radiation methods produce ozone in only minimal concentrations, which are in many cases insufficient for a particular application. In addition, ultraviolet UV lamps are bulky, so that an ultraviolet ozone generator cannot be very compact, and the lamps are also fragile, expensive, and subject to burning out.

As a result, electrical means for producing ozone, in particular by way of a corona discharge to create the ozone molecule, are the most practical and popular methods currently in use. In known manner, ozone may be produced by passing an oxygen ($O_2$) containing gas through a high voltage discharge or corona. A corona discharge is a discharge of electricity within the gaseous dielectric (for example air) along the surface of and between the conductors or electrodes. The structure of a corona discharge device, two conductors separated by a dielectric (gas) is similar to that of a capacitor. The corona discharge, which appears as a blueish-purple glow, is due to the ionization of the insulating gas between the electrodes. This discharge occurs when the field potential gradient of an alternating current exceeds the corona start or threshold voltage and continues until the voltage is reduced or stopped. The field potential gradient is the voltage per unit length along the conductive path of the device.

For producing ozone, an oxygen containing gas is supplied as the insulating gas between the conductors (i.e. into the corona field) This causes some of the oxygen ($O_2$) molecule bonds to split, freeing two ionized oxygen atoms which create ozone when colliding with other oxygen molecules and/or with other ionized oxygen atoms. It is usually necessary for the oxygen containing gas to be dried, and it is also advantageous for the gas to be cooled. The most readily available gas for this purpose is air which contains approximately 78% diatomic nitrogen ($N_2$) and 21% oxygen ($O_2$). However, a more concentrated source of oxygen can also be used. The ozone/gas mixture discharged from prior art corona discharge ozone generators normally contains from 1% to 3% ozone (by weight) when using dry air, and 3% to 6% ozone (by weight) when using high purity oxygen as the feed gas.

A solid dielectric material, in addition to the gaseous dielectric, is usually included between the two electrodes or conductors to prevent shorting between the electrodes and to intensify the electric field. The solid dielectric may be plastic, ceramic, or glass for example. The solid dielectric is gapped or spaced from at least one of the electrodes to allow for space for the air or feed gas to flow through the corona region. For structural simplicity, in many prior art devices the solid dielectric abuts or runs along one of the conductors while being spaced from the other.

One drawback of corona discharge units is that when air is used as the insulating gas, there is a potential danger that some of the high composition of nitrogen ($N_2$) may ionize and break into singlets which react to form nitric oxide (NO), nitrogen dioxide ($NO_2$) or nitrous oxide ($N_2O$). Formation of these compounds inhibits the ozone generation process. This potential problem is heightened when there is a substantial amount of water vapour in the air and when the applied electrical voltage is very high.

In general, prior art corona discharge generators are based on designs which use either flat plate conductors or circular tube conductors. The first of these designs employs relatively large surface area plates consisting of electrodes and a dielectric assembled in parallel to one another, with suitable spacing between the electrode layers to establish the arc or insulating gap. The feed gas or air is then blown in parallel across the surface of the dielectric and electrodes. The second type of prior art corona discharge design uses concentric dielectric tubes and cylindrical conductors. The dielectric lies concentrically between the two conductors, often abutting against the outer surface of the inner conductor with the outer electrode formed by a steel tube or steel mesh concentrically spaced around the outer circumference of the dielectric tube. As a result, at least the outer electrode will have a relatively large surface area. The feed gas is directed parallel to the axis of the tubes between the outer wall of the dielectric tube and the inner wall of the outside electrode tube. As high voltage AC power is applied between the concentric electrodes, corona will develop in the region between the electrodes.

These prior art designs are subject to several shortcomings. First they require a high operating voltage to sustain a corona throughout the entire insulating or dielectric area. Second, the flat or tubular electrodes, particularly mesh electrodes, and the solid dielectrics tend to sag or warp with heat resulting in random corona fields throughout the insulating region. Third, in many of these designs, only a very low percentage of feed (or oxygen containing) gas passes through the corona discharge field. Fourth, because the electrodes and the corona discharge region are relatively lengthy in many prior art designs, some of the ozone generated may decompose, under the continued presence of the corona field, before exiting the device. Fifth, because of the high operating voltages, there is a greater probability of undesirable nitrous oxide compounds being produced, as mentioned above. Sixth, these designs problematically facilitate the depositing of undesirable compounds which are generated on the electrode and solid dielectric surfaces. Seventh, these prior art designs are generally very bulky and often require multiple layers and components. Finally, prior art corona discharge devices offer little ability to control or vary the amount of ozone produced.

SUMMARY OF THE INVENTION

In a first aspect, the present invention provides a corona discharge device, for generating ozone from an oxygen containing gas flow, the device comprising: first and second electrodes, the first electrode including a first line edge surface having a length substantially greater than the thickness thereof and the second electrode including a second line edge surface having a length substantially greater than the thickness thereof; wherein the first and second line edge surfaces are arranged spaced apart, facing one another to define a corona discharge region having a substantially uniform width; and wherein the first and second electrodes are configured to cause an oxygen containing gas to flow through the corona discharge region transversely across the line edge surfaces, whereby in use, with a high voltage AC power supply connected across the first and the second electrodes, a corona discharge is established in the corona discharge region causing generation of ozone from oxygen in the gas flow.

In one embodiment, each of the first and second line edge surfaces comprises a plurality of edge segments, which are spaced apart and which extend in substantially the same direction, and each of the first and second electrodes comprises a base portion and plurality of protruding portions extending therefrom, with the edge segments of the first edge surface being provided along the edges of the protruding portions of the first electrode and the edge segments of the second edge surface being provided along opposite edges of the protruding portions of the second electrode, and wherein the protruding portions of the first and second electrodes form an interdigitated configuration.

Preferably, each of the first and second electrodes is generally sheet form. Also preferably, each of the first and second electrodes can be substantially flat, and the edge segments of each of the first and second electrodes can be generally straight.

In a preferred embodiment, the corona discharge device includes a plurality of dielectric wafers provided between facing edge segments of the first and second edge surfaces and lying within the corona discharge region. The dielectric wafers may advantageously extend in a plane generally perpendicular to the first and second electrodes, and each dielectric wafer may advantageously be mounted substantially equidistant between the first and second edge surfaces.

The corona discharge device can include a chamber, housing the first and second electrodes, and including an inlet for receiving an oxygen containing gas and an outlet for providing an ozone containing gas. Also, the first and second electrodes may be formed from stainless steel and the dielectric wafers may be formed from ceramic. The corona discharge device can generally include a high voltage AC power circuit connected to the first and second electrodes for providing an AC voltage across the first and second electrodes in use, to generate the corona discharge.

In another aspect, the present invention provides a corona discharge device comprising: (a) a chamber housing; (b) a first generally sheet-form electrode mounted inside said chamber housing, said first electrode having a base portion and N first protruding portions extending from said base portion, N being a positive integer greater than or equal to one, said first electrode having a top and a bottom surface and first line edge surface having a thickness corresponding to the thickness of the first electrode and extending around the protruding portions, said first line edge surface having an area which is substantially smaller than the surface area of either said top or said bottom surface; (c) a second generally sheet-form electrode mounted inside said chamber housing, said second electrode having a base portion and N second protruding portions extending from said base portion, said second electrode having a top and a bottom surface and a second line edge surface having a thickness corresponding to the thickness of the second electrode and extending around the second protruding portions, said second line edge surface having an area which is substantially smaller than the surface area of either said top or said bottom surfaces, thin top and bottom surfaces of said second electrode being coextensive with the top and bottom surfaces respectively of said first electrode, the protruding portions of said first and second electrodes being shaped and positioned to form an interdigitated configuration, to define a corona discharge region between the first and second electrodes, wherein the first and second protruding portions include edge segments of the first and second line edge surfaces, which edge segments are generally straight are disposed in parallel to and directly opposite one another so as to form 2N–1 corona discharge region segments therebetween, each of said discharge region segments being of generally uniform width; and (d) a high voltage AC power circuit connected to said first and second electrodes for providing an AC voltage across said first and second electrodes.

Preferably, N is at least two. Also preferably 2N–1 dielectric wafers are mounted in the chamber housing with each of the dielectric wafers lying within one of the 2N–1 corona discharge region segments. Each of the 2N–1 dielectric wafers advantageously lies in a plane which is perpendicular to the top surfaces of the first and second electrodes and parallel to the edge segments of protruding portions of the first and second electrodes. It is also advantageous for each of the 2N–1 dielectric wafers to lie substantially midway within one of the 2N–1 corona discharge region segments. The 2N−1 dielectric wafers may have a first end mounted within an appropriately positioned slot in the first electrode and a second end mounted within an appropriately positioned slot in the second electrode.

Preferably, the chamber housing includes an inlet for receiving an oxygen containing gas and an outlet for providing an ozone containing gas. The chamber housing may further comprise stream fins attached to an inner wall of the chamber housing for directing the oxygen containing gas from said inlet through the 2N−1 corona discharge region segments.

The first and second electrodes can be made of stainless steel and each of said 2N−1 dielectric wafers can be made of ceramic. Furthermore, the device can include a first insulating sheet for covering at least a portion of the top surfaces of said first and second electrodes and a second insulating sheet for covering at least a portion of the bottom surfaces of said first and second electrodes.

The chamber housing can be one of: tubular shaped and rectangularly shaped. Preferably, the AC voltage provided to the first and second electrodes has sharp leading edges. Also, the high voltage AC power circuit advantageously includes a corona adjustment level circuit for adjusting the mark-space ratio of the AC voltage provided to the first and second electrodes.

The objects and advantages of the present invention will be better understood with reference to the remainder of the description and the drawings.

BRIEF DESCRIPTION OF THE DRAWINGS

In the accompanying drawings which illustrate, by way of example, preferred embodiments of the invention:

FIGS. 6A and 6B illustrates application of the electrode configuration of FIG. 5 in a rectangular chamber for a corona discharge device;

FIGS. 7A and 7B illustrates application of the electrode configuration of FIG. 5 in a tubular or cylindrical chamber for a corona discharge device.

DETAILED DESCRIPTION OF THE INVENTION

Figure 1:
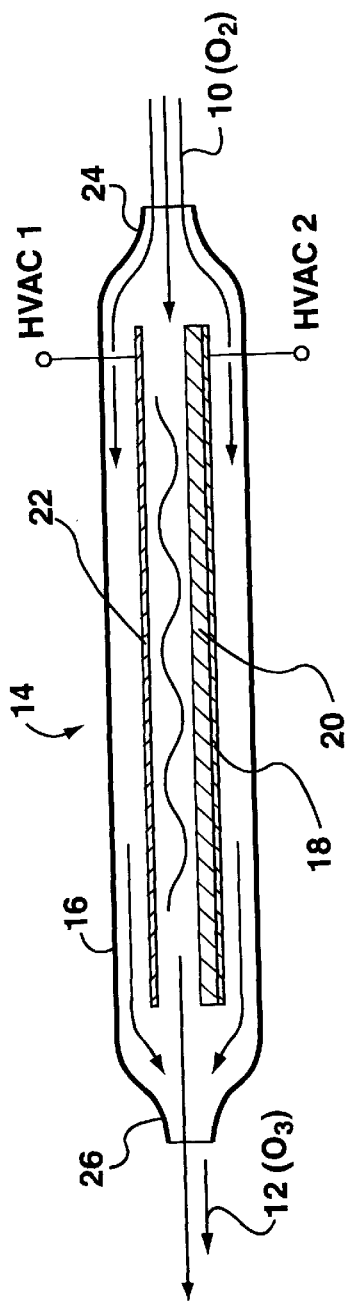
FIG. 1 shows a prior art corona discharge device using flat panel electrodes with large surface areas.

FIG. 1 shows a prior art corona discharge device 14 for converting a feed gas 10 containing oxygen (such as air) into an output gas 12 containing ozone. As shown in FIG. 1, the device 14 has a first flat electrode plate 18 with a solid dielectric layer 20 along its inner surface and a second electrode plate 22. The electrode plates 18 and 22 are generally made from a conducting material which is resistant to ozone such as stainless steel. The dielectric material may be ceramic or another suitable insulator. The electrodes 18 and 22 are mounted within a chamber or housing 16 which may be rectangular or box-like in shape, and is usually made of a durable plastic. A high voltage AC signal, HVAC, present between the terminals HVAC1 and HVAC2 is applied across the electrodes 18 and 22, as shown in FIG. 1.

In operation, the feed gas 10 enters the chamber at the inlet 24 of the chamber 16. The HVAC signal, which for this device must generally reach at least 5–6 kV (i.e., 5,000–6,000 Volts) in amplitude to "start" the corona, periodically generates a corona discharge between the electrodes. The strength of the corona field between the electrodes 18 and 22 is heightened by the presence of the solid dielectric layer 20 therebetween. Within the chamber 16, feed gas which passes between the electrodes 18 and 22 may have its oxygen molecules ionized resulting in ozone generation. The output gas 12, which contains an ozone concentration, exits the chamber at the outlet 26. In known manner, the output gas 12 may be supplied to water or air, for example, for purification thereof.

Figure 2:
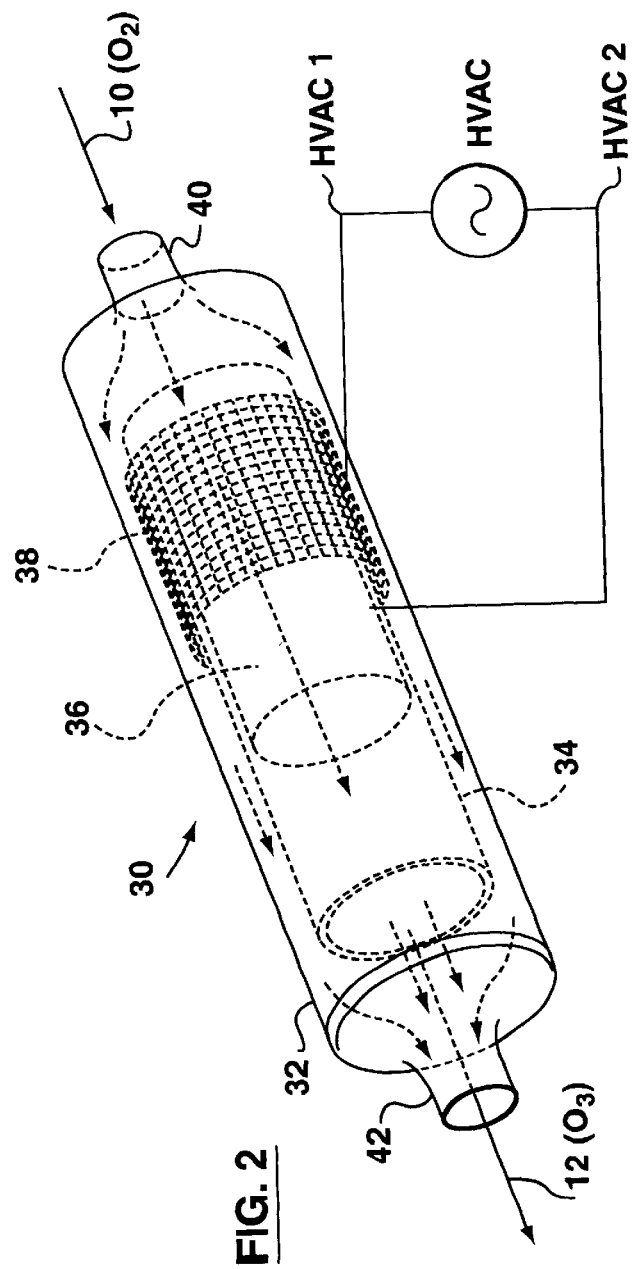
FIG. 2 shows a prior art corona discharge device using tubular electrodes.

FIG. 2 shows another prior art corona discharge device 30 which is based on a tubular or cylindrical electrode structure. Again, the device converts a feed gas 10 containing oxygen into an output gas 12 containing ozone The discharge device 30 includes a vaporized conductive surface 36 which forms an inner electrode along the inner wall of a dielectric tube 34. The dielectric tube 34 may be constructed from glass or another suitable dielectric solid. A concentric steel mesh 38 is concentrically wrapped around the outer circumference of the dielectric tube forming an outer electrode having a relatively large surface area. These components are mounted in a tubular chamber 32, having an inlet 40 for the feed gas 10 and an outlet 42 for the output gas 12 containing ozone.

In operation, the feed gas 10 is directed parallel to the axis of the electrode mesh and the dielectric tube. The feed gas which travels between the outer wall of the dielectric tube 34 and the inner wall of the outside electrode mesh 38 has its oxygen molecules ionized leading to the production of ozone.

Due to the high voltage levels required in corona discharge devices, the electrodes as well as the dielectric layer in such devices tend to heat up. High temperatures can damage the chamber housing (which is usually made up of plastic or metal) of corona discharge devices. Heat can also damage the components of the corona discharge device and significantly curtail the ozone generation process. Furthermore, where the chamber housing is made of a conductive material such as metal, a voltage breakdown may occur between the housing and an electrode if the electrodes are in close proximity to the housing. For these reasons, in each of the prior art devices of FIG. 1 and FIG. 2, it is necessary to provide significant space between the chamber walls and the conductors 20 and 22 in FIG. 1 or the outer conductor 38 in FIG. 2 to provide sufficient space for keeping the housing cool (as well as to cool the electrodes and dielectric to some extent with the surrounding feed gas or air) and for avoiding the possibility of voltage breakdown. Consequently, as feed gas enters the chamber, part of the gas passes through the corona field between the electrodes and part of the gas passes around the parallel flat plate electrode surfaces (as shown in FIG. 1) or around the outer surface of the outer electrode mesh (as shown in FIG. 2). This means that only a certain percentage of the feed gas entering their corona discharge chamber is exposed to corona and can potentially undergo ionization to form ozone.

Furthermore, in prior art corona discharge devices the electrode plates have a relatively large surface area to ensure sufficient production of ozone. The flat plate and tube corona discharge devices described above, by virtue of their electrodes having a relatively large surface area, also have a very high capacitance. In known manner, the capacitance of a corona discharge device is directly proportional to the surface area of the parallel or concentric faces of the electrodes which enclose the insulating dielectric. Because of this higher capacitance and larger surface area, the prior art devices require a higher operating voltage to sustain corona throughout the entire plate area field. A higher operating voltage not only consumes more energy, but also increases the heating of the device. As mentioned, excessive heat can affect the ozone generation process and can also damage the solid dielectric material.

Moreover, because of the large surface areas of the electrodes in the prior art devices of FIGS. 1 and 2, it is difficult to achieve an even arc gap at all surface points between the electrodes. Flat electrodes and particularly flat mesh electrodes, sag or warp under the heat in the assembly, and generally only random corona fields will be set up throughout the region. Consequently, some parts of the electrode areas will have spotty or missing corona, while other areas may experience hot spots where the excess field intensity may cause premature failure of the dielectric plate. The random nature of the corona fields can affect the probability of effective conversion to ozone, for that portion of feed gas which does enter the corona field.

Since these prior art corona discharge devices have a relatively lengthy corona region, ozone which is generated between the electrodes near the inlet side of the chamber must travel over the remainder of the high temperature corona region before exiting the chamber. There is a significant probability that some of this ozone will decompose before reaching the outlet side of the corona discharge chamber. This probability is heightened significantly when the temperature in the chamber reaches 100° C., since ozone is known to decompose rapidly at temperatures over that level. Thus the temperature in the chamber should not be allowed to run excessively hot.

For all of the above reasons, it is not possible to achieve a high rate of ozone conversion using the prior art flat corona discharge generators of FIGS. 1 and 2. In general, these devices only achieve about 20–25% of the amount of ozone conversion possible for a given amount of feed gas.

Furthermore, because of the requirement of an elevated operating voltage to drive the prior art corona discharge devices, there is also a greater probability that nitrogen in the feed gas may also be ionized by the intense corona field so that the compounds nitric oxide, nitrogen dioxide, or nitrous oxide $N_2O$ may form between the surfaces of the dielectric plates and electrodes (whether solid or mesh steel). This is of particular concern where the feed gas is air (which is approximately 78% nitrogen) and is more likely to occur where the feed gas is humid or mixed with water vapour. Corona discharge ozone generators which are operated under voltage peak levels above 15 kV are particularly susceptible to the formation of nitric acids (especially under humid conditions). The generation of these undesirable oxides or compounds will further limit the production of ozone gas due to deposits on the dielectric and electrode surfaces which inhibit the formation of corona and which may, in time, render the device inoperative. The formation of these nitric oxides on the solid dielectric and electrode layers may be further aggravated by the large surface areas and by restrictive mesh electrodes which do not allow for drainage of the oxides in the early stages of formation.

Because of the poor conversion efficiency of the prior art corona discharge devices, particularly the flat parallel plate device of FIG. 1, a stack of multiple alternating sets of electrode and dielectric are usually added together to compensate for the loss in efficiency (of a single layer). These multi-layer flat plate corona discharge devices are larger in size, more expensive to manufacture, and require an even greater driving voltage to operate. The reliability of a multi-element generator using flat plates is also compromised due to the increased number of components in comparison with a single discharge set chamber.

The present invention was designed to overcome and/or minimize all of the above deficiencies associated with prior art corona discharge devices. In particular, the present invention is based on the realization that it is only necessary to pass the air or feed gas through a solid wall or curtain of corona discharge produced between thin edge or line-like electrode surfaces, and through which the air or feed gas has a relatively short transit time compared to prior art devices.

The high efficiency corona discharge device according to the invention preferably uses sheet form electrodes having a relatively large surface area but with a relatively small thickness defined by a line edge. The line edge electrodes may, for example, have a thickness in the range of about 10–50 mil and preferably have a thickness in the range of 20–30 mil (where 1 mil=0.0254 mm). However, instead of placing the large surface areas of these electrodes in parallel with one another so that the plane of the first electrode is effectively above the plane of the second electrode (thus forming a large corona discharge region as in the prior art), the electrodes are aligned so that they generally lie in the same plane with line edges of each electrode being parallel to one another.

Figure 3:
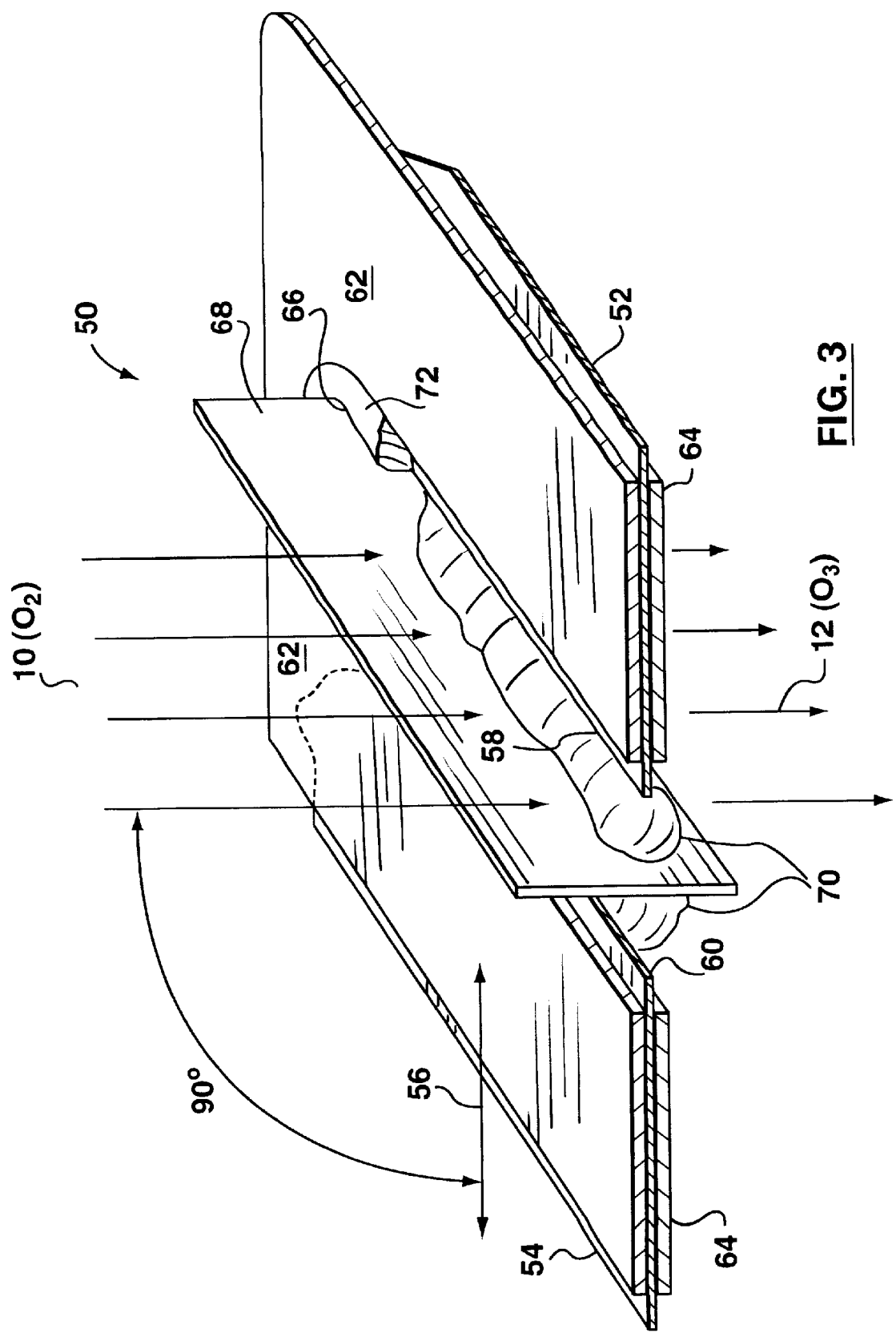
FIG. 3 shows the general electrode configuration for the corona discharge device according to the present invention.

FIG. 3 shows the general electrode configuration 50 for the corona discharge device according to a preferred embodiment of the present invention. The top surfaces (and correspondingly the bottom surfaces as well) of the flat plate electrodes 52 and 54 lie in the same plane, indicated generally by the double-headed arrow 56, with the narrow thickness straight line edge 58 of electrode 52 and the Farrow thickness straight line edge 60 of electrode 54 are parallel to and face (i.e. arc directly opposite to) one another, to define a corona discharge region 61 having a substantially uniform width. Electrodes 52 and 54 preferably are made of stainless steel, a conductor which is resistant to ozone. When the electrodes 52 and 54 are energized by a HVAC signal, a corona discharge field 70 is generated between the elongated line edges 58 and 60 as shown in FIG. 3.

Preferably (and as shown in FIG. 3), a dielectric slab or wafer 68 lies within the gap between edges 58 and 60, i.e. the corona discharge region, and is oriented in a plane which is perpendicular to the plane of the top and bottom surfaces of the electrodes 52 and 54. The inclusion of a dielectric slab 68 advantageously acts to significantly intensify the corona discharge 70. As indicated in FIG. 3, the dielectric wafer 68 may be mounted into a dielectric mounting slot 66 within the electrode layer 52 and into a similar slot (not shown) within the electrode layer 54. The mounting slots are dimensioned to provide a tight, sliding fit with the ends of the wafer 68. Preferably, silicone 72 or another suitable adherent, can be used to secure the ends of the dielectric wafer 68 in place. The dielectric mounting slots 66 are also made accurately to ensure that the proper spacing of the wafer 68 is obtained.

For maximum effect, the strength of the corona may be further amplified if the dielectric slab 68 is placed about half way between each of the edges 58 and 60, so that relatively equal strength corona fields are generated on each side of the dielectric 68 (see FIG. 3). The dielectric slab 68 is preferably made from ceramic. Unlike in the present invention, the ability to position a solid dielectric at the centre of the gap between the electrodes was difficult to achieve in prior art designs because of inherent structural limitations. As a result, in prior art designs the dielectric generally abuts a surface of one of the electrodes.

It is also preferable for a first insulating sheet or layer 62 to cover at least a portion of the top surfaces of the electrodes 52 and 54 and for a second insulating sheet 64 to cover at least a portion of their bottom surfaces (creating the sandwich-like structure shown in FIG. 3). The insulating cover sheets 62 and 64 can be conveniently used to mount the electrodes within a chamber housing as well as to help keep the electrodes flat. The insulating sheet covers 62 and 64 are preferably made from glass-filled silicone or a glass-filled resin material.

As illustrated in FIG. 3, in the present invention the feed gas 10 is now directed perpendicularly to the surfaces of the electrodes 52 and 54 through the gap created between the edges 58 and 60. This is unlike prior art corona discharge designs in which the feed gas is directed parallel to the main or large surfaces of the electrodes.

Figure 4:
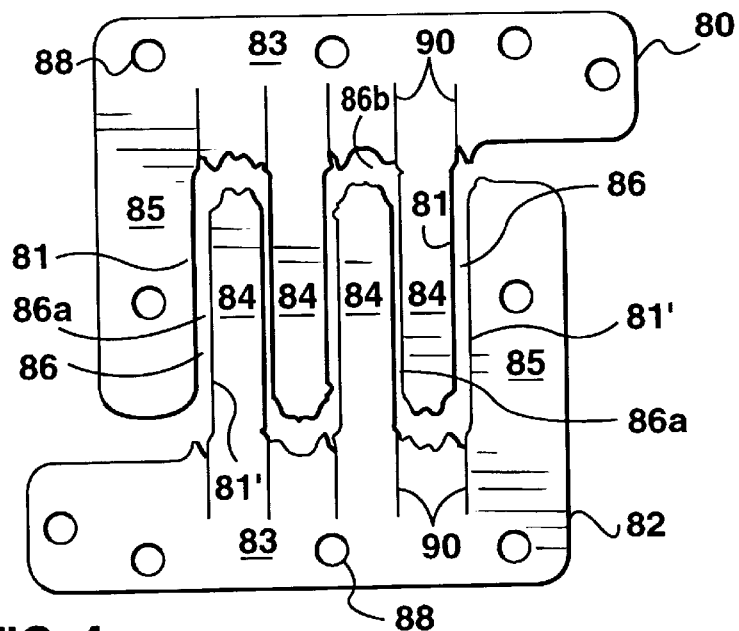
FIGS. 4 and 5 show a configuration of flat panel electrodes according to preferred embodiments of the invention.

FIG. 4 shows a top view of a pair of flat panel electrodes 80 and 82 according to a preferred embodiment of the invention. The electrodes have a relatively thin thickness going into the page (the thickness is defined by the line edges of the electrodes, as explained above). According to this embodiment, each of the electrodes 80 and 82 has a base portion 83 from which a thumb 85 and several fingers 84 (which may generally be referred to as protruding portions or protrusions) extend. The thumbs 85 and fingers 84 are shaped and interdigitated with another so that a serpentine shaped gap 86 is formed between the line edges of the thumbs 85 and fingers 84 of the two electrodes. When the electrodes 80 and 82 are energized with a HVAC signal a corona discharge will develop within the serpentine gap 86.

It will be seen that the serpentine gap 86 comprises a number of straight discharge region segments 86*a*, which are generally parallel to one another. Correspondingly, each region segment 86*a* of the corona discharge region is defined by opposite and parallel edge segments 81 and 81 of the two electrodes 80 and 82. Each of the segments 86*a* continue into mounting slots 90 for receiving dielectric wafers, as detailed below. The slots 90 are dimensioned to provide a tight, sliding fit with the wafers. For example, with a line electrode thickness of 25 mil, the dielectric mounting slots 90 may have a width of 30 mil for dielectric wafers with a width of 25 mil (1 mil=0.0254 mm). The region segments 86*a* could correspondingly have a width of 75 mil, to provide a spacing on either side of the wafers of 25 mil. For these dimensions, the straight discharge region segments 86*a* may be approximately 2000 mil or 2 inches long, for example. Thus, unlike in the prior art, the narrow wall or curtain of corona discharge generated by the present invention may have a thickness (which is approximately the thickness of the line edge electrodes— e.g. 25 mil for the dimensions given above) which is significantly less than the cross-sectional dimensions of the corona discharge region (e.g. the region segment width of 75 mil or the region segment length of 2000 mil for the dimensions given above).

The corona discharge within the serpentine gap 86 may be limited to the straight discharge region segments 86*a* in which the serpentine gap 86 is preferably narrower compared to the U-shaped gap segments 86*b,* as shown in FIG. 4. This can be conveniently accomplished by blocking off the portions of the electrode line edges between the dielectric mounting slots 90 with silicone.

Holes 88 are provided in the electrodes 80, 82 for mounting in a housing. Conveniently, the electrodes 80, 82 are formed together from a sheet of suitable steel, by cutting with a water jet. More preferably, the cutting is initially done so as to leave fine strands interconnecting the two electrodes 80, 82. This then ensures that a corona discharge gap is maintained at the desired and a constant spacing along its length. The electrodes 80, 82 are then secured within a housing or chamber, by screws or other fasteners, placed in the holes 88. As in FIG. 3, the electrodes may be mounted and secured in a sandwich-like structure between two insulating layers. With the electrodes 80, 82 secured, the strands interconnecting the electrodes 80, 82 can be removed, without disturbing the spacing or gap between the two electrodes.

Figure 5:
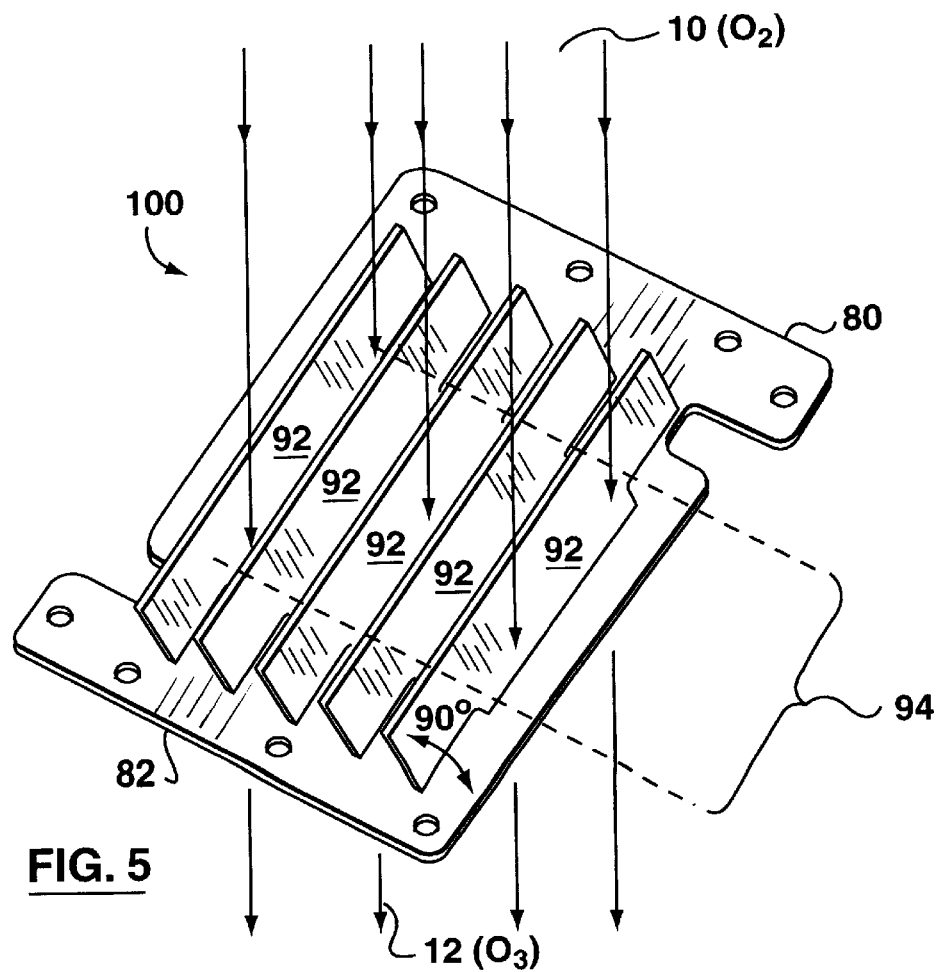

FIG. 5 shows a preferred embodiment of an electrode configuration 100 which uses the electrodes 80 and 82 of FIG. 4 along with a dielectric wafer 92 perpendicularly placed within each of the main portions (i.e. the lengthy portions which lie parallel to one another) of the serpentine gap 86. Each of the electrodes 80 and 82 has slots 90 (shown in FIG. 4) for receiving the dielectric wafer along those main portions of the serpentine gap 86. As before, the dielectric wafers 92 can be advantageously centered within the main portions of the serpentine gap 86.

Referring to FIG. 5, when the electrodes are pulsed by a high voltage AC (HVAC) driver circuit, a solid curtain or wall of corona as indicated by 94 develops throughout at least the straight region segments 86*a* of the serpentine gap formed between the narrow edge or line surfaces of the electrode fingers 84 and thumbs 85 and the dielectric wafers 92. As may be seen in FIG. 5, all of the air or feed gas 10 must pass through the corona field curtain 94 at right angles to the surfaces of the electrodes 80 and 82. As a result, the feed gas 10 may be treated or ionized to achieve a very high concentration of ozone in the output gas 12.

It should be noted that FIG. 3 may represent a section of the configuration 100 of FIG. 5 in which the electrodes. 52 and 54 are fingers 84 (or thumbs 85) of the electrodes 80 and 82 respectively and in which the dielectric wafer 68 is one of the dielectric wafers 92. Thus, although not shown in FIGS. 4 and 5, the electrodes 80 and 82 may have insulating layers covering their top and bottom surfaces (similar to the insulating sheets 62 and 64 in FIG. 3) for convenient mounting and to help maintain the form of electrodes 80 and 82. Furthermore, the electrode plates 80 and 82 may be precision cut with a computer controlled machining tool in known manner, and in one embodiment the thin line edges of the electrodes may be cut to have jagged or rough surfaces, as this may enhance the corona discharge field.

It will also be clear that the electrodes 80 and 82 may, in general, have any number, N, of protruding portions or protrusions (where N is an integer greater than or equal to one). In general, where the electrodes have N protrusions, the serpentine path 86 will have 2N−1 straight segments 86*a* in which a corona field is generated. Thus, if the electrodes 80 and 82 each have only a single protrusions (e.g. a thumb 85 and no fingers 84), the electrode configuration 100 of FIG. 5 will be similar to that in FIG. 3, and there will be only one segment 86*a* in which there is a corona discharge. Similarly, if each electrode has two protrusions, there will be three segments 86*a* in which there is a discharge, if each electrode has three protrusions, there will be five segments 86*a* in which there is a discharge (as shown in FIG. 5), and so on. Clearly, the more segments 86*a* in which there is a discharge, the more feed gas that can be simultaneously subject to corona discharge.

The corona discharge element of the present invention can be fitted into any shape or size housing made with plastic or metal to, for example, provide ozone gas for sterilizing air or water. For instance, the electrode configuration 100 may be conveniently mounted in a chamber for use as a corona discharge device, such as the rectangular chamber 110 in FIG. 6A or the tubular or cylindrical chamber 120 in FIG. 7A. As shown in the top view of FIG. 6B, a rectangular chamber has an inlet 112 for receiving an oxygen containing feed as 10 and an outlet 114 for providing the output gas 12 containing ozone. Each electrode of the electrode configuration 100 is mounted at 118, at which an electrical connection (not shown) to the HVAC driving voltage can also be made. Air stream fins 116 are attached to the top 111 and bottom 113 surfaces of the used to help direct the feed gas 10 through the corona curtain of the electrode configuration 100 (i.e. in a direction perpendicular to the plane of the electrodes). It is also possible to angle the inlet 112 so that when the feed gas 10 enters the chamber 110 is already directed in part toward the plane of the electrodes (and correspondingly angle the outlet 114 for the output gas 12 moving away from the plane of the electrodes.

Note that where the size of the rectangular chamber 110 permits, the electrode configuration 110 may be rotated by 90° from the position in which it is at in FIG. 6B so that the feed gas 10 entering from the inlet 112 flows immediately perpendicular to the plane of the electrodes, obviating the need for the air stream fins 116.

Referring to FIG. 7E, the tubular housing 120 has a front end cap 122 having an inlet 126 for feed gas 10 and an rear end cap 124 having an outlet 128 for output gas 12. The electrode configuration 100 is mounted, for example at 130 in FIG. 7A, diametrically within the housing 120. Again this mounting will generally include the necessary electrical connections (not shown) from the electrodes to the HVAC power source.

The advantages of the electrode configuration for the corona discharge device of the present invention will be readily appreciated. First, the present invention eliminates the problems associated with using large surface area plates of the electrodes, by using a very thin elongated line edge electrode surface areas to create the corona field. Preferably, the electrodes are generally sheet form and have surfaces that are of significantly larger area than the line edges to help maintain the structural stability and mechanical stiffness as for large surface area electrodes in the prior art. Additionally, for such sheet form electrodes, the feed gas is directed at right angles to the main or large planar surfaces of the electrodes and not in parallel thereto, as is done with prior art flat plate designs. The line edge electrodes combined with the ability to pass all of the available feed gas through a corona discharge region provide greatly improved conversion efficiency along with a significant reduction in the necessary driving voltage. Thus, the corona discharge device of the present invention can be used its an ozone generator to produce up to 10% or more ozone (by weight) using air as the feed gas, thereby providing significant improvements over prior art ozone generators. The present invention may also operate with a HVAC driving voltage having a peak of between 3–4 kV (compared to 8 kV or greater in most prior art corona discharge devices), greatly reduced corona discharge chamber temperatures, and a lower assembly cost.

Furthermore, because the corona discharge device of the present invention operates at a much lower voltage level, it is not prone to the generation of the nitrogen oxides mentioned above. Additionally, the solid dielectric plates or slabs are oriented perpendicularly and so any possible formation of oxides can drift or drain away from the corona field, while the small edged surfaces of the electrodes provide little opportunity for the formation or build-up of oxides thereon.

Moreover, the corona discharge device of the present invention is designed to operate as only a single layer electrode device since it provides maximum conversion efficiency whereby virtually all feed gas is treated for conversion. Therefore, no complex and costly multi-layer assemblies are necessary.

Figure 8:
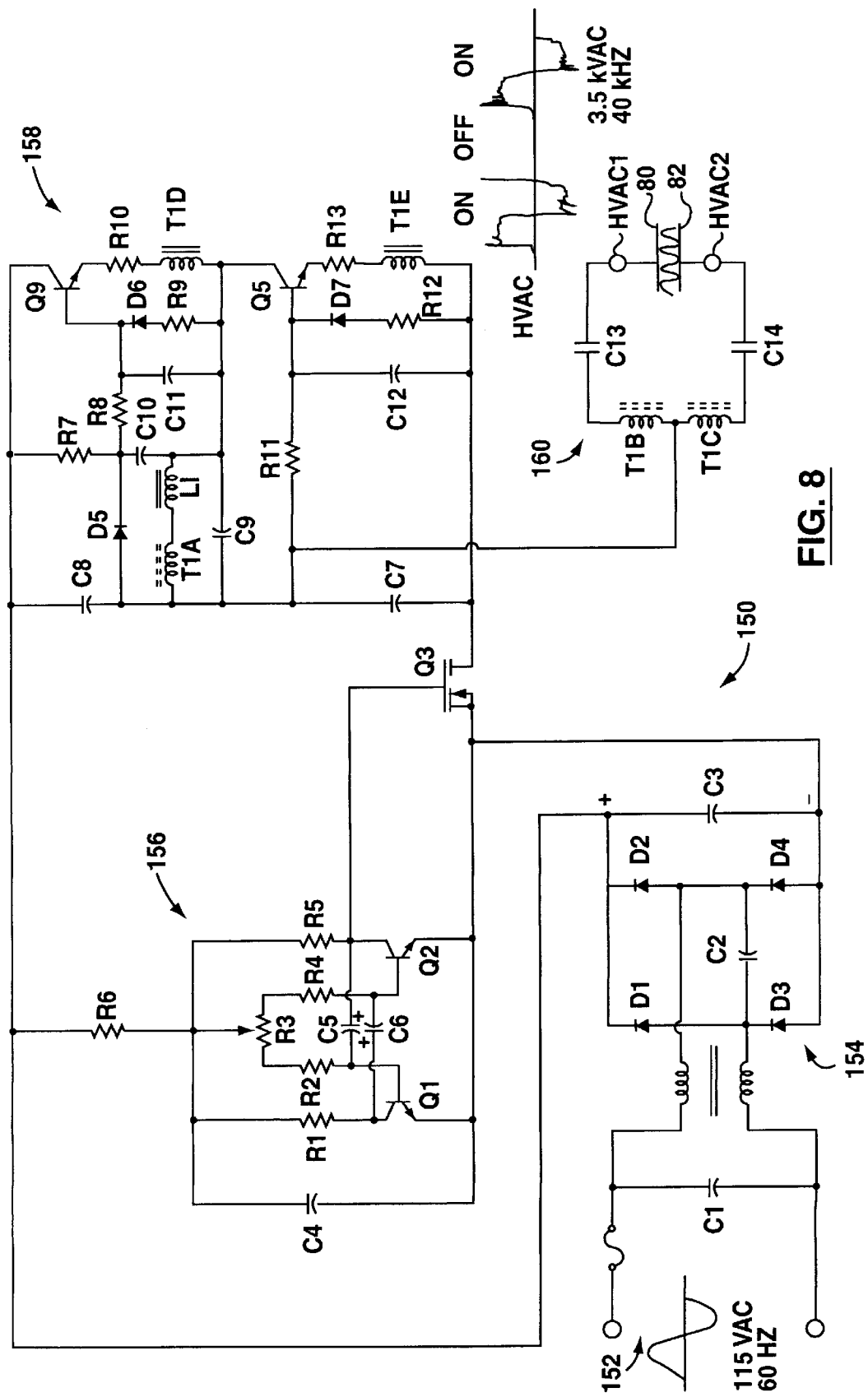
FIG. 8 illustrates a possible embodiment of a HVAC circuit for driving the corona discharge device of the present invention.

FIG. 8 shows a possible embodiment of a circuit 150 for generating the HVAC signal for driving the corona discharge device of the present invention. At 152, the circuit receives a line voltage as input (e.g. 115 VAC at 60 Hz). Rectifying circuit 154, including filter capacitors C1 and C2) and the rectifying diode bridge of D1–D4 generates a fully rectified version of the input 152 across capacitor C3. The fully rectified signal is provided to a corona adjustment level circuit 156 which includes a duty cycle transistor switch Q3. The fully rectified signal is also coupled via the switch Q3 to an oscillator and power output drive circuit 158 which drives the output stage 160 to provide the HVAC signal to the electrode terminals 80 and 82 (FIGS. 4 and 5). The sub-circuit 158, in a manner which will be well understood to those skilled in the art, is a half-wave bridge circuit that increases the frequency of oscillation and steps-up the AC voltage level of the input via a power transformer T1. The power transformer T1 has a primary winding T1A, a set of secondary windings T1B and T1C, and a set of tertiary windings T1D and T1E.

The duty cycle switch Q3 is turned on when the voltage at the gate of Q3 (and the collector of Q2) is high and turned off when the voltage at the gate of Q3 is low. As shown in FIG. 8, the corona adjustment level circuit 156 includes an adjustable potentiometer R3 and a common emitter configuration for Q1 and Q2 in which the bases and collectors of Q1 and Q2 are cross-coupled via capacitors C5 and. C6. The fully rectified DC signal is provided to the corona adjustment level circuit 156 by way of a drop down resistor R6 which is coupled to the collectors of transistors Q1 and Q2 via the resistors R1 and R5 respectively. The resistor R6 is also connected to R3, which provides an adjustable voltage divider between resistors R2 and R4. The adjustment control of the potentiometer R3, which for example may be a rotating shaft, can be brought out with at wire from the housing of the circuit 150 to enable external adjustment of R3. Adjustment of the potentiometer R3 varies the voltage at the bases of Q1 and Q2 in a complementary manner. Varying R3 changes the duty cycle of the voltage at the collector of Q2 and the gate of Q3, i.e. the amount of the amount of time Q3 is on compared to one period of the input signal 152. Note that the gate of Q3 could alternatively be coupled to the collector of Q1 (which would simply invert the effect of adjustment of R3).

The output waveform of the HVAC signal is shown in FIG. 8. The adjustment of R3 controls the mark-space ratio of the power provided to the corona discharge elements, and thereby controls the level of ozone produced by the feed gas. (The mark-space ratio is the ratio of the duration of a single pulse to the interval between two successive recurrent pulses. It is related to the duty cycle, i.e. a duty cycle of 50% corresponds to a mark-space ratio of 1.) As shown in FIG. 8, the HVAC signal may have a peak value of 3.5 kVAC (which is much lower than in the prior art) and an operating frequency (i.e. when transistor Q3 is on) up to about 40 kHz. The relatively high frequency of oscillation in the output allows the circuit 150 to be made smaller.

The oscillator and power output drive circuit 158 provides the output HVAC with very sharp leading edges (i.e. very fast rise times) in its waveform to power the corona discharge device of the present invention. This may be seen from the illustrated HVAC waveform in FIG. 8 which has an underdamped leading edge characteristic as shown. These sharp leading edges in the HVAC signal can advantageously aid to initiate the corona discharge sooner.

With the adjustable duty cycle power circuit of FIG. 8, the corona discharge unit of the present invention can be applied to a broad range of applications that require controllable rates of ozone in a low cost, light weight, and reliable package.

It should also be noted that although ozone generation is in fact the most common use of the corona discharge device of the present invention, other possible applications also exist. For instance, corona treating is an effective tool for increasing the surface tension of many materials (such as polyethylene, polypropylene, nylon and vinyl). The material is exposed to ionized oxygen atoms, chemically activating the surface and making it much more receptive to inks, coatings, adhesives, and the like. Furthermore, ionization of atoms other than oxygen could be generated by a corona discharge unit, for use in other possible applications.

While preferred embodiments of the present invention have been described, the embodiments disclosed are illustrative and not restrictive, and the invention is intended to be defined by the appended claims.

What is claimed is:

1. A corona discharge device, for generating ozone from an oxygen containing gas flow, the device comprising:

first and second electrodes, the first electrode including a first line edge surface having a length substantially greater than the thickness thereof and the second electrode including a second line edge surface having a length substantially greater than the thickness thereof;

wherein the first and second line edge surfaces are arranged spaced apart, facing one another to define a corona discharge region having a substantially uniform width;

wherein the first and second line edge surfaces comprises a plurality of edge segments, which are spaced apart and which extend in substantially the same direction, wherein each of the first and second electrodes comprises a base portion and plurality of protruding portions extending therefrom, with the edge segments of the first edge surface being provided along the edges of the protruding portions of the first electrode and the edge segments of the second edge surface being provided along opposite edges of the protruding portions of the second electrode, and wherein the protruding portions of the first and second electrodes form an interdigitated configuration; and wherein the first and second electrodes are configured to cause an oxygen containing gas to flow through the corona discharge region transversely across the line edge surfaces, whereby in use, with a high voltage AC power supply connected across the first and the second electrodes, a corona discharge is established in the corona discharge region causing generation of ozone from oxygen in the gas flow.

2. A corona discharge device as claimed in claim 1, wherein each of the first and second electrodes is substantially sheet form.

3. A corona discharge device as claimed in claim 2, wherein each of the first and second electrodes is substantially flat.

4. A corona discharge device as claimed in claim 3, wherein the edge segments of each of the first and second electrodes are generally straight.

5. A corona discharge device as claimed in claim 3, which includes a plurality of dielectric wafers provided between facing edge segments of the first and second edge surfaces and lying within the corona discharge region.

6. A corona discharge device as claimed in claim 4, which includes a plurality of dielectric wafers, each of which is provided between a pair of facing edge segments, extending in a plane generally perpendicular to the first and second electrodes.

7. A corona discharge device as claimed in claim 6, wherein each dielectric wafer is mounted substantially equidistant between the first and second edge surfaces.

8. A corona discharge device as claimed in claim 7, which includes a chamber, housing the first and second electrodes, and including an inlet for receiving an oxygen containing gas and an outlet for providing an ozone containing gas.

9. A corona discharge device as claimed in claim 8, wherein the first and second electrodes are formed from stainless steel and the dielectric wafers are formed from ceramic.

10. A corona discharge device as claimed in claim 9, which includes a high voltage AC power circuit connected to the first and second electrodes for adapted to provide an AC voltage across the first and second electrodes in use, to generate the corona discharge.

11. A corona discharge device comprising:

(a) a chamber housing;

(a) a first substantially sheet-form electrode mounted inside said chamber housing, said first electrode having a base portion and N first protruding portions extending from said base portion, N being a positive integer greater than or equal to one, said first electrode having a top and a bottom surface and first line edge surface having a thickness corresponding to the thickness of the first electrode and extending around the protruding portions, said first line edge surface having an area which is substantially smaller than the surface area of either said top or said bottom surface;

(c) a second substantially sheet-form electrode mounted inside said chamber housing, said second electrode having a base portion and N second protruding portions extending from said base portion, said second electrode having a top and a bottom surface and a second line edge surface having a thickness corresponding to the thickness of the second electrode and extending around the second protruding portions, said second line edge surface having an area which is substantially smaller than the surface area of either said top or said bottom surfaces, the top and bottom surfaces of said second electrode being coextensive with the top and bottom surfaces respectively of said first electrode, the protruding portions of said first and second electrodes being shaped and positioned to form an interdigitated configuration, to define a corona discharge region between the first and second electrodes, wherein the first and second protruding portions include edge segments of the first and second line edge surfaces, which edge segments are generally straight are disposed in parallel to and directly opposite one another so as to form 2N−1 corona discharge region segments therebetween, each of said discharge region segments being of generally uniform width; and (d) a high voltage AC power circuit connected to said first and second electrodes for adapted to provide an AC voltage across said first and second electrodes.

12. A device according to claim 11, wherein N is at least two.

13. A device according to 12, further comprising 2N−1 dielectric wafers mounted in said chamber housing, each of said dielectric wafers lying within one of said 2N−1 corona discharge region segments.

14. A device according to claim 13, wherein each of said 2N−1 dielectric wafers lies in a plane which is perpendicular to the top surfaces of said first and second electrodes and parallel to the edge segments of protruding portions of said first and second electrodes.

15. A device according to claim 14, wherein each of said 2N−1 dielectric wafers lies substantially midway within one of said 2N−1 corona discharge region segments.

16. A device according to claim 15, wherein each of said 2N−1 dielectric wafers has a first end mounted within an appropriately positioned slot in said first electrode and a second end mounted within an appropriately positioned slot in said second electrode.

17. A device according to claim 13, wherein said chamber housing includes an inlet for receiving an oxygen containing gas and an outlet for providing an ozone containing gas.

18. A device according to claim 17, wherein said chamber housing further comprises stream fins attached to an inner wall of said chamber housing for directing said oxygen containing gas from said inlet through said 2N−1 corona discharge region segments.

19. A device according to claim 13, wherein said first and second electrodes are stainless steel and each of said 2N−1 dielectric wafers are ceramic.

20. A device according to claim 13, further including a first insulating sheet for covering at least a portion of the top surfaces of said first and second electrodes and a second insulating sheet for covering at least a portion of the bottom surfaces of said first and second electrodes.

21. A device according to claim 13, wherein said chamber housing is one of: tubular shaped and rectangularly shaped.

22. A device according to claims 13, wherein the AC voltage provided to the first and second electrodes has sharp leading edges.

23. A device according to claim 13, wherein said high voltage AC power circuit includes a corona adjustment level circuit for adjusting the mark-pace ratio of the AC voltage provided to the first and second electrodes.

24. A corona discharge device, for generating ozone from an oxygen containing gas flow, the device comprising:
first and second electrodes, the first electrode including a first line edge surface having a length substantially greater than the thickness thereof and the second electrode including a second line edge surface having a length substantially greater than the thickness thereof;
wherein the first and second electrodes are substantially sheet form and wherein said first and second electrodes lie in substantially the same surface;
wherein the first and second line edge surfaces are arranged spaced apart, facing one another to define a corona discharge region having a substantially uniform width; and
wherein the first and second electrodes are configured to cause an oxygen containing gas to flow through the corona discharge region transversely across the line edge surfaces, whereby in use, with a high voltage AC power supply connected across the first and the second electrodes, a corona discharge is established in the corona discharge region causing generation of ozone from oxygen in the gas flow.

25. A corona discharge device as claimed in claim 24, wherein each of the first and second electrodes is substantially planar.

26. A corona discharge device as claimed in claim 25, wherein the edge segments of each of the first and second electrodes are generally straight.

27. A corona discharge device as claimed in claim 25, which includes a plurality of dielectric wafers provided between facing edge segments of the first and second edge surfaces and lying within the corona discharge region.

28. A corona discharge device as claimed in claim 26, which includes a plurality of dielectric wafers, each of which is provided between a pair of facing edge segments, extending in a plane generally perpendicular to the first and second electrodes.

29. A corona discharge device as claimed in claim 28, wherein each dielectric wafer is mounted substantially equidistant between the first and second edge surfaces.

30. A corona discharge device as claimed in claim 29, which includes a chamber, housing the first and second electrodes, and including an inlet for receiving an oxygen containing gas and an outlet for providing an ozone containing gas.

31. A corona discharge device as claimed in claim 30, wherein the first and second electrodes are formed from stainless steel and the dielectric wafers are formed from ceramic.

32. A corona discharge device as claimed in claim 31, which includes a high voltage AC power circuit connected to the first and second electrodes adapted to provide an AC voltage across the first and second electrodes in use, to generate the corona discharge.

33. A corona discharge device, for generating ozone from an oxygen containing gas flow, the device comprising:
first and second electrodes, the first electrode including a first line edge surface and the second electrode including a second line edge surface;
wherein the first and second line edge surfaces are arranged spaced apart, facing one another to define a corona discharge region having a substantially uniform width;
wherein the first and second electrodes are configured to cause an oxygen containing gas to flow through the corona discharge region transversely across the line edge surfaces, whereby in use, with a high voltage AC power supply connected across the first and the second electrodes, a corona discharge is established in the corona discharge region causing generation of ozone from oxygen in the gas flow;
wherein the thickness of said first line edge surface as measured in a direction parallel to the direction of flow of oxygen containing gas through the corona discharge region is substantially less than the length of said first line edge surface;
wherein the thickness of said second line edge surface as measured in a direction parallel to the direction of flow of oxygen containing gas through the corona discharge region is substantially less than the length of said second line edge surface; and
wherein the device comprises only one pair of first and second electrodes.

34. A corona discharge device as claimed in claim 33, wherein each of the first and second electrodes is substantially sheet form.

35. A corona discharge device as claimed in claim 34, wherein each of the first and second electrodes is substantially flat.

36. A corona discharge device as claimed in claim 35, wherein the edge segments of each of the first and second electrodes are generally straight.

37. A corona discharge device as claimed in claim 35, which includes a plurality of dielectric wafers provided between facing edge segments of the first and second edge surfaces and lying within the corona discharge region.

38. A corona discharge device as claimed in claim 36, which includes a plurality of dielectric wafers, each of which is provided between a pair of facing edge segments, extending in a plane generally perpendicular to the first and second electrodes.

39. A corona discharge device as claimed in claim 38, wherein each dielectric wafer is mounted substantially equidistant between the first and second edge surfaces.

40. A corona discharge device as claimed in claim 39, which includes a chamber, housing the first and second electrodes, and including an inlet for receiving an oxygen containing gas and an outlet for providing an ozone containing gas.

41. A corona discharge device as claimed in claim 40, wherein the first and second electrodes are formed from stainless steel and the dielectric wafers are formed from ceramic.

42. A corona discharge device as claimed in claim 41, which includes a high voltage AC power circuit connected to the first and second electrodes adapted to provide an AC voltage across the first and second electrodes in use, to generate the corona discharge.

* * * * *